United States Patent [19]

Willford

[11] Patent Number: 4,920,813
[45] Date of Patent: May 1, 1990

[54] POWER TAKE-OFF CONTROL APPARATUS

[75] Inventor: George A. Willford, Toledo, Ohio

[73] Assignee: Dana Corporation, Toledo, Ohio

[21] Appl. No.: 196,918

[22] Filed: May 20, 1988

[51] Int. Cl.$^5$ .................. F16H 37/00; F16H 3/08; B60K 20/00; G05G 9/00

[52] U.S. Cl. .................. 74/11; 74/364; 74/475; 74/477

[58] Field of Search .................. 92/61; 91/525, 529; 74/364, 475, 477, 11, 15.8, 15.82, 15.84, 15.86, 15.88

[56] References Cited

U.S. PATENT DOCUMENTS

| | | | |
|---|---|---|---|
| 787,480 | 4/1905 | Tanner | 92/62 |
| 2,095,820 | 10/1937 | Lenz | 91/167 R |
| 2,226,660 | 12/1940 | Eaton et al. | 74/334 |
| 2,575,982 | 11/1951 | Stevens | 137/596.1 |
| 2,931,237 | 4/1960 | Backus | 74/335 |
| 2,944,435 | 7/1960 | Hendrickson | 74/364 |
| 2,974,766 | 3/1961 | Perkins et al. | 74/364 |
| 3,059,433 | 10/1962 | Hirsch | 60/565 |
| 3,640,146 | 2/1972 | Barnes | 74/364 |
| 3,866,727 | 2/1975 | Myers | 188/134 |
| 3,958,493 | 5/1976 | Fujita et al. | 91/525 |
| 4,068,537 | 1/1978 | Wolfe | 74/477 |
| 4,149,428 | 4/1979 | Mueller | 74/364 |
| 4,388,843 | 6/1983 | Teeter | 74/477 |
| 4,440,037 | 4/1984 | Foxton et al. | 74/477 |
| 4,531,422 | 7/1985 | Yarnell | 74/475 |
| 4,722,237 | 2/1988 | McNinch, Jr. | 74/364 |
| 4,748,863 | 6/1988 | McNinch, Jr. | 74/477 |

Primary Examiner—Leslie A. Braun
Assistant Examiner—Harold F. Macris
Attorney, Agent, or Firm—MacMillan, Sobanski & Todd

[57] ABSTRACT

Power take-off control apparatus which automatically shifts a vehicle speed range transmission into neutral whenever a power take-off mechanism is engaged to prevent accidental engagement of a drive gear while the power take-off mechanism is in use. A piston is moved in response to fluid pressure to shift the speed range transmission between high and low speed gear ranges. The power take-off mechanism is engaged in response to fluid pressure from a control valve. Whenever fluid pressure is applied to engage the power take-off mechanism, the fluid pressure moves the piston to an intermediate neutral position to disengage the vehicle drive.

3 Claims, 2 Drawing Sheets

POWER TAKE-OFF CONTROL APPARATUS

TECHNICAL FIELD

The invention relates to controls for mechanical vehicle speed range transmissions for heavy duty trucks and other vehicles of the type having an auxiliary power take-off mechanism, and more particularly to improved power take-off control apparatus for automatically shifting a speed range transmission into neutral while the power take-off mechanism is engaged to prevent engagement of any of the forward or reverse vehicle drive gears.

BACKGROUND ART

A mechanical transmission for a vehicle such as a heavy duty truck will often have two speed ranges, with a number of gear ratios in each range. For example, an eight speed transmission may have a high speed range with four gear ratios and a low speed range with four gear ratios. The transmission will basically be a four speed transmission in combination with an auxiliary or speed range transmission which selects either the high speed range or the low speed range. The speed range is selected by the position of a range selecting rod. The range selecting rod moves between one extreme end position where the low speed range is selected and another extreme end position where the high speed range is selected. At an intermediate position of the range selecting rod, the transmission will be in neutral.

Range selection of the auxiliary or speed range transmission is often operated by pressurized fluid, such as a compressed air system on a truck. In many trucks, for example, the transmission also will have provisions for a power take-off mechanism for driving equipment other than the vehicle wheels. For safety reasons, it may be desirable to prevent engagement of the forward and reverse vehicle drive gears while the power take-off mechanism is engaged. If the auxiliary transmission is accidentally shifted into gear by an operator during operation of the power take-off mechanism while the vehicle is stationary, a catastrophe may occur. U.S. Pat. No. 4,531,422 to Yarnell discloses a transmission shift rod interlock system which includes a spring biased plunger. Before engaging the power take-off mechanism, air pressure is removed from a cylinder/piston device which positions a range selecting rod for normally selecting either the high speed range or the low speed range. When air pressure is removed, the plunger acts on cam surfaces on the range selecting rod to center the range selecting rod in neutral. The operator then engages the power take-off mechanism.

DISCLOSURE OF INVENTION

According to the present invention, apparatus is provided for automatically shifting and maintaining a transmission range selecting rod in a neutral position whenever a power take-off mechanism is engaged to prevent accidental engagement of a vehicle drive gear. The apparatus, which is fluid operated, includes a two position manual speed selection control valve which controls the application of fluid pressure through a shuttle valve to a cylinder. By selecting either a high speed range or a low speed range, fluid pressure is applied to one of two sides of a main piston to move the piston between two extreme end positions. The main piston is attached to and moves the transmission range selecting rod between the high speed range setting at one end position and the low speed range setting at the other end position. When the piston is at an intermediate position between the extreme positions, the transmission is in neutral.

A two position manually operated power take-off mechanism control valve controls the application of fluid pressure either to the shuttle valve and thence to the cylinder for positioning the range selection rod or to apparatus for engaging the power take-off mechanism. When fluid pressure is applied to engage the power take-off mechanism, fluid pressure also is applied to the range selection cylinder to move an auxiliary piston from a first or retracted position to a second or extended position. The auxiliary piston does not limit movement of the main piston between the end positions when in its retracted position. When the power take-off mechanism is engaged and the auxiliary piston is moved to its extended position, travel of the first piston is restricted to between one end position and the intermediate position where the transmission is in neutral. When fluid pressure is applied by the control valve to actuate the power take-off mechanism, the control valve also applies fluid pressure through a shuttle valve to the cylinder to move the main piston from its end position toward the auxiliary piston, until it is stopped at the intermediate, neutral position by the auxiliary piston. It will be noted that the fluid pressure on the main and auxiliary pistons will be from the same source and hence both pistons are subjected to the same fluid pressure. The auxiliary piston is provided with a larger surface area than the main piston to provide a greater force holding the auxiliary piston at its extended position than the force exerted on the main piston. As a consequence, the main piston is firmly held in the neutral position whenever the power take-off mechanism is engaged.

It is an object of the invention to provide improved power take-off control apparatus for centering a transmission speed range selecting rod in neutral whenever a power take-off mechanism is engaged.

Other objects and advantages of the invention will be apparent from the following detailed description and the accompanying drawings.

BEST MODE FOR CARRYING OUT THE INVENTION

Figure 1:
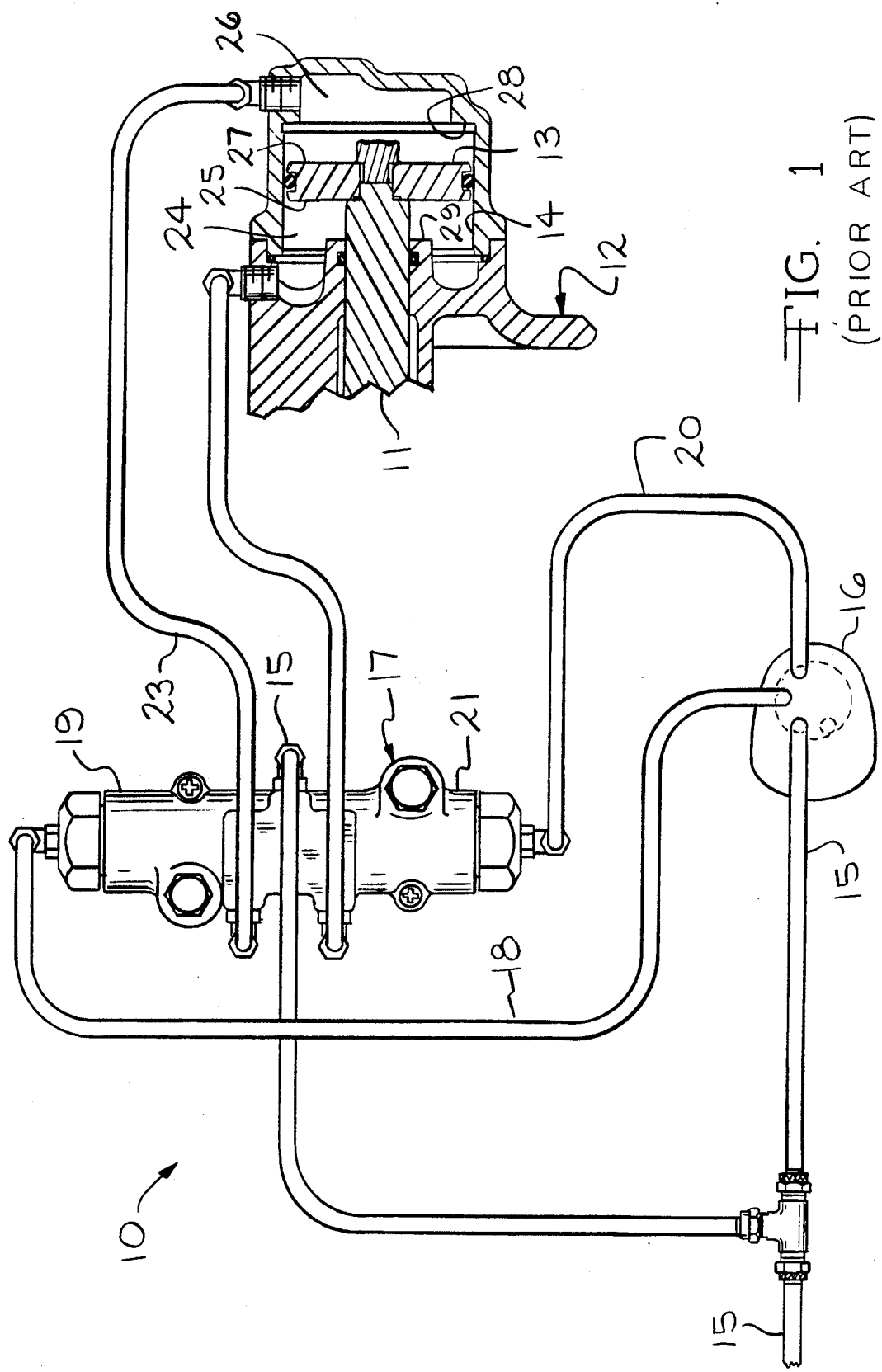
FIG. 1 is a schematic diagram of prior art apparatus for controlling a transmission range selection rod for shifting between high and low speed ranges.

Turning to FIG. 1, a schematic diagram is shown of typical prior art apparatus 10 for positioning a range selecting rod 11 on a transmission 12 (shown in fragmentary) for shifting between high and low speed ranges. The range selecting rod 11 is positioned by an attached piston 13 which is mounted to move in a cylinder 14.

The apparatus 10 is fluid operated, for example from a conventional engine driven compressor (not shown) on a truck connected to supply compressed air to an air line 15. Of course, it will be appreciated that the apparatus 10 also can be operated by a hydraulic fluid rather that air. The air line 15 is connected to a manually positioned high-low speed range control valve 16 and through a shuttle valve 17 to the cylinder 14. The control valve 16 is connected through a line 18 to supply pilot air from the line 15 to an end 19 of the shuttle valve 17 for selecting the high speed gear range and the control valve 16 is connected through a line 20 to supply pilot air from the line 15 to an opposite end 21 of the shuttle valve 17 for selecting the low speed gear range. The valve 17 includes a conventional shuttle or spool (not shown) which is moved axially between a first position towards the valve end 21 wherein the air line 15 is connected to a first output air line 22 and a second position towards the valve end 19 wherein the air line 15 is connected to a second output air line 23. The first air line 22 is connected to a first expansion chamber 24 in the cylinder 14 on one side 25 of the piston 13 and the second air line 23 is connected to a second expansion chamber 26 on an opposite side 27 of the piston 13.

When the control valve 16 is positioned to apply pilot air from the line 15 over the line 18 to the shuttle valve 17, air is supplied from the air line 15 through the shuttle valve 17, over the line 22 to the chamber 24 to move the piston 13 to the right against a stop 28. The piston 13 in turn moves the range selecting rod 11 to select the high speed gear range. When the operator positions the control valve 16 to apply pilot air from the line 15 over the line 20 to the shuttle valve 17, air is supplied from the air line 15 through the shuttle valve 17, over the line 23 to the chamber 26 to move the piston 13 to the left against a stop 29. The piston in turn moves the range selecting rod 11 to select the low speed gear range. The apparatus 10 has no provision for positioning the range selecting rod 11 at an intermediate position between the stops 28 and 29 to place the transmission 12 in neutral and the apparatus 10 operates independently of any control for engaging a power take-off mechanism.

Figure 2:
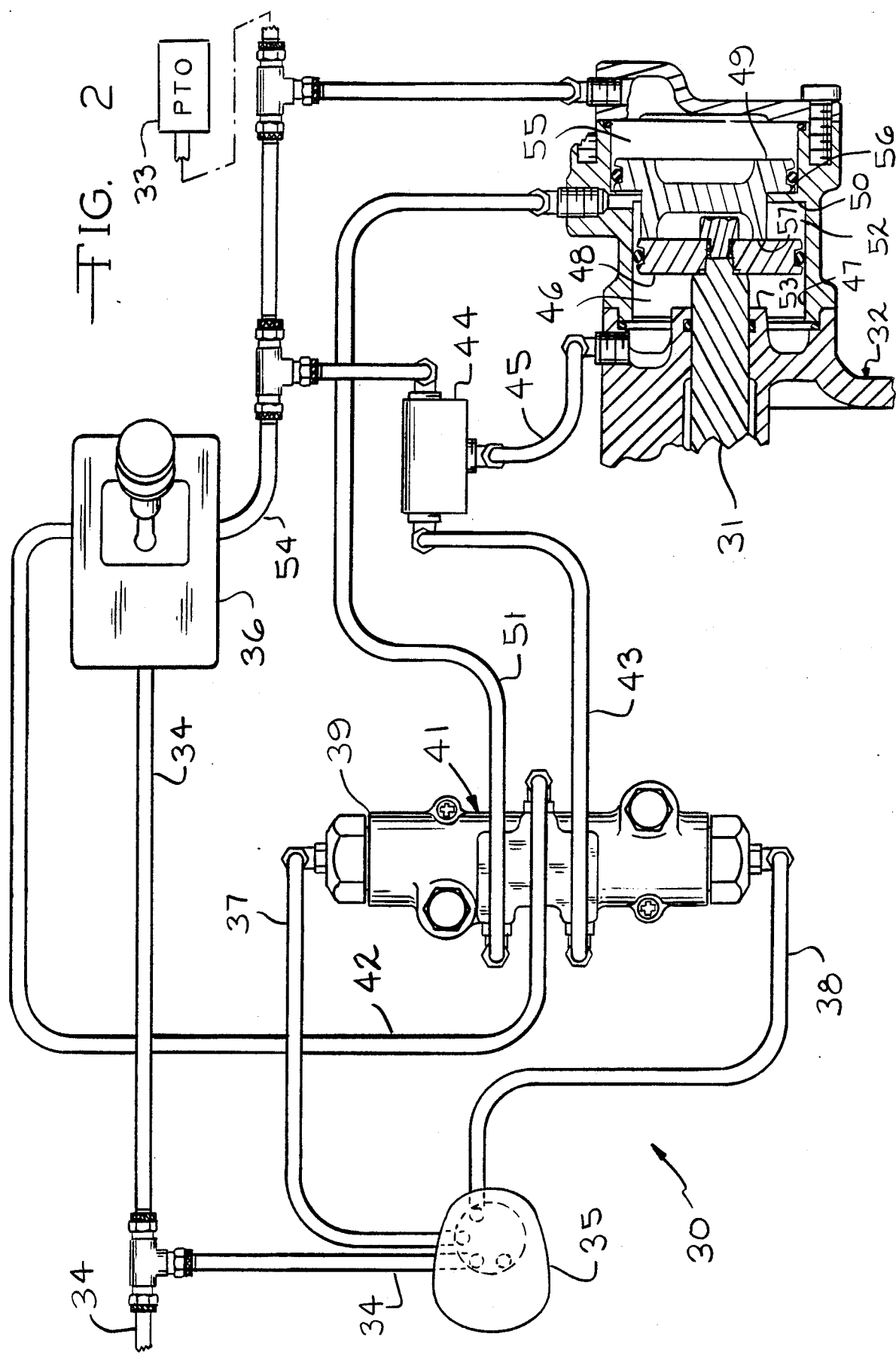
FIG. 2 is a schematic diagram of power take-off control apparatus according to the invention for positioning and maintaining a transmission speed range selecting rod in neutral whenever a power take-off mechanism is engaged.

FIG. 2 is a schematic diagram of power take-off control apparatus 30 for positioning and maintaining a speed range selection rod 31 for a transmission 32 (shown in fragmentary) in neutral whenever a power take-off mechanism actuator 33 is engaged. The apparatus 30 is operated from a suitable fluid source, such as a compressed air line 34 available on many heavy duty trucks. The apparatus 30 includes a two position manual control valve 35 for selecting high or low speed gear ranges for the transmission 32 and a two position manual control valve 36 for selectively engaging and disengaging the power take-off mechanism through the actuator 33. The control valve 35 has two pilot air lines 37 and 38 connected to opposite ends 39 and 40, respectively, of a shuttle valve 41.

During normal operation of a vehicle in which the transmission 32 is mounted, compressed air flows from the line 34 through the valve 36 and a line 42 to the shuttle valve 41. When the valve 35 is positioned to select the high speed gear range, pilot air flows from the line 34 through the valve 35 and the line 37 to move a spool or shuttle (not shown) in the valve 41 toward the end 40, thereby connecting the air line 42 to an air line 43. The air line 43 is connected through a shuttle valve 44 and a line 45 to apply compressed air to a chamber 46 formed in a cylinder 47 to one side of a main piston 48 which is attached to the range selecting rod 31. The compressed air in the chamber 46 will move the piston 48 to the right, thereby moving the rod 31 to the right to engage the high speed gear range. The cylinder 47 includes an auxiliary piston 49 which is shown positioned to the left in FIG. 2, but is normally positioned to the right when the vehicle is in its drive mode. Thus, the piston 48 will move further to the right to abut a stop 50 when the high speed gear range is selected.

When the control valve 35 is moved to select the low speed gear range, compressed air flows from the line 34 over the pilot air line 38 to the shuttle valve 41 to move the internal valve shuttle toward the valve end 39. When the valve shuttle moves, the air line 42 is connected through an air line 51 to a chamber 52 defined in the cylinder 47 between the main piston 48 and the auxiliary piston 49. At the same time, the valve 41 vents the chamber 46 and the compressed air in the chamber 52 moves the piston 48 to abut a stop 53. When the piston 48 is against the stop 53, the transmission 32 will be in the low gear range. As the piston 48 moves from against the high gear range stop 50 to the low gear range stop 53, it passes through the intermediate position shown in FIG. 2. When the piston 48 is in the intermediate position, the transmission 32 will be in neutral.

When the operator desires to operate the power take-off mechanism, the control valve 36 is manually moved to a "PTO" position wherein the air line 34 is connected to a line 54 and the air line 42 to the shuttle valve 41 is vented. The venting of the air line 42 to the shuttle valve 41 inhibits the valve 41 from supplying air to either line 43 or line 51, thereby preventing the piston 48 from moving the rod 31. The air line 54 is connected to the power take-off mechanism actuator 33. In order to position the rod 31 in the intermediate position while the power take-off mechanism is engaged, the air line 54 is connected to a chamber 55 in the cylinder 47 and through the shuttle valve 44 and the line 45 to the chamber 46 in the cylinder 47. The application of compressed air on the line 54 to the actuator 33 engages the power take-off mechanism. At the same time, the compressed air applied to the chamber 55 moves the auxiliary piston 49 to the left to an extended position where it abuts a stop 56, as shown in FIG. 2. When the auxiliary piston 49 is in the extended position against the stop 56, an end 57 on the auxiliary piston 49 projects into the chamber 52. As stated above, the control valve 36 also applies compressed air to the shuttle valve 44. The shuttle valve 44 passes compressed air from either the line 43 or the line 54 to the chamber 46, while isolating the lines 43 and 54 from each other. Thus, air flows from the line 54 through the shuttle valve 44 to the chamber 46 to move the main piston 48 to the right until it abuts the end 57 on the auxiliary piston 49. The auxiliary piston end 57 is located to position the main piston 48 at the intermediate position where the transmission 32 is in neutral. It will be noted that since air from the line 54 is applied to both the chamber 55 and the chamber 46, both chambers will have the same air pressure. In order to assure that the main piston 48 is stopped at the intermediate neutral position, the auxiliary piston 49 is provided with a larger diameter than the main piston 48. The larger surface area on the auxiliary piston 49 exposed to the air pressure over the surface area of the main piston 48 results in a greater force moving the auxiliary piston 49 to the left than the force moving the main piston 48 to the right. Consequently, the air pressure in the chamber 55 will hold the auxiliary piston 49 against the stop 56 while the air pressure in the chamber 46 holds the main piston 48 against the auxiliary piston end 57 to assure that the transmission 32 will always be in neutral whenever the power take-off mechanism is engaged.

When the operator desires to disengage the power take-off mechanism, the control valve 36 is moved to a position wherein the air line 34 is again connected through the line 42 to the shuttle valve 41 and the air line 54 is vented to disengage the actuator 33. Depending upon the setting of the control valve 35, the shuttle valve 41 will again supply compressed air either on the line 43 for engaging the high speed gear range or on the line 51 for engaging the low speed gear range. When compressed air is first applied on the line 43, the piston 48 will move to the right and will push the auxiliary piston 49 to the right where it is retracted into the chamber 55 until the piston 48 abuts the stop 50. The auxiliary piston 49 presents little resistance to this movement since the chamber 55 will be vented through the line 54 and the control valve 36.

It will be appreciated that various modifications and changes may be made to the above described power take-off control apparatus without departing from the spirit and the scope of the following claims.

I claim:

1. Power take-off control apparatus for a transmission including an actuator responsive to fluid pressure for selectively engaging and disengaging a power take-off mechanism, a control valve for selectively applying and interrupting fluid pressure to said actuator, said transmission further having speed range gears shiftable by movement of a range selecting rod between a high speed gear range wherein said transmission is operable in one of a first plurality of gear ratios and a low speed gear range wherein said transmission is operable in one of a second plurality of gear ratios, a fluid operated control for moving said range selecting rod between a first position engaging said high speed gear rage, an intermediate neutral position and a second position engaging said low speed gear range, said power take-off control apparatus being characterized by first means for inhibiting said fluid operated control from moving said range selecting rod to either of said first and second positions when said control valve applies fluid pressure to said actuator to engage the power take-off mechanism, and second means always responsive to said control valve applying fluid pressure to said actuator to engage the power take-off mechanism for positioning and holding said range selecting rod in said intermediate position between said first and second positions whenever fluid pressure is applied to said power take-off mechanism actuator.

2. Power take-off control apparatus, as set forth in claim 1, wherein said fluid operated control includes a main piston attached to said rod and mounted to slide in a cylinder between said first and second positions, said main piston and said cylinder defining first and second expansion chambers on opposite sides of said main piston, means for applying pressurized fluid to said first chamber for moving said main piston and said rod to said first position, and means for applying pressurized fluid to said second chamber for moving said main piston and said rod to said second position, and wherein said first means interrupts the application of pressurized fluid from said fluid operated control to said first and second chambers in response to said control valve applying fluid pressure to said power take-off mechanism actuator.

3. Power take-off control apparatus, as set forth in claim 2, wherein said second means includes an auxiliary piston mounted to slide in said cylinder between a retracted position which does not interfere with movement of said main piston between said first and second positions and an extended position wherein said auxiliary piston limits movement of said main piston to between one of said first and second positions and said intermediate position, and means responsive to said control valve applying fluid pressure to said power take-off mechanism actuator for moving said auxiliary piston to said extended position and for moving said main piston to said intermediate position in contact with said auxiliary piston.

* * * * *